March 11, 1924.
S. BREST
AUTOMOBILE RADIATOR HEATER
Filed Jan. 6, 1922
1,486,480
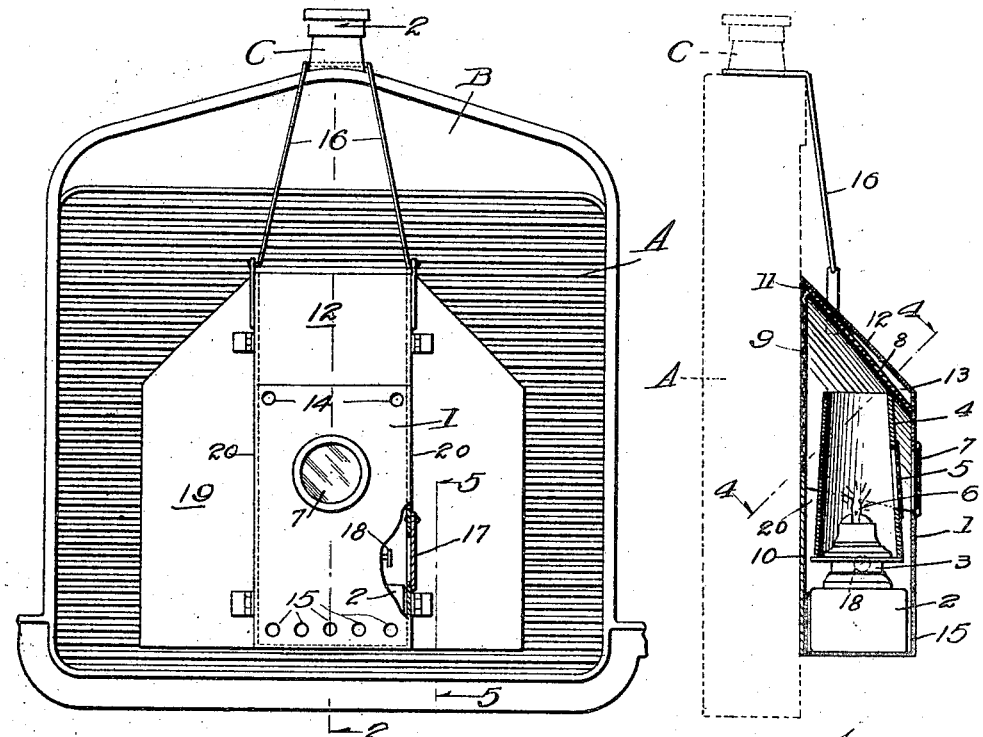
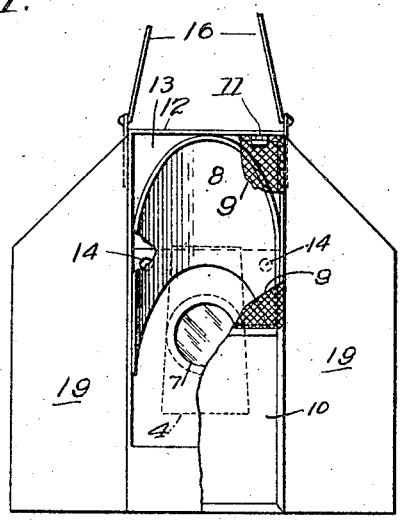
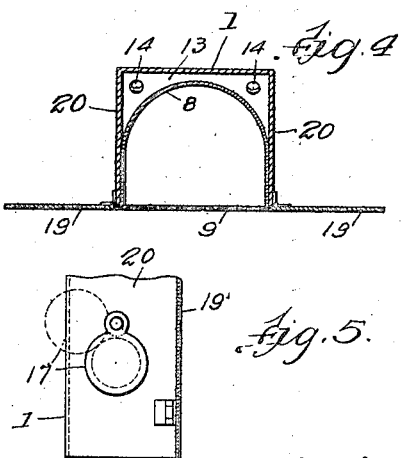
Fig. 1. Fig. 2. Fig. 3. Fig. 4. Fig. 5.
Witness:
Inventor: Sam Brest, by his Attys.

Patented Mar. 11, 1924.

1,486,480

UNITED STATES PATENT OFFICE.

SAM BREST, OF CHICAGO, ILLINOIS.

AUTOMOBILE RADIATOR HEATER.

Application filed January 6, 1922. Serial No. 527,396.

*To all whom it may concern:*

Be it known that I, SAM BREST, a citizen of the United States, residing in the city of Chicago, in the county of Cook and the State of Illinois, have invented certain new and useful Improvements in Automobile Radiator Heaters, of which the following is a specification, reference being had to the accompanying drawings, forming a part thereof.

The purpose of this invention is to provide a heating device adapted to be readily applied to an automobile radiator or the like, and capable of maintaining a sufficient temperature in the water of the radiator and circulatory system to avoid freezing in any part of said system. It consists of certain features and elements of construction hereinafter described and shown in the drawings as indicated by the claims.

In the drawings:—

Figure 1 is a front elevation of an automobile radiator with a heater embodying this invention applied thereto.

Figure 2 is a vertical section of the heater taken as indicated at line, 2—2, on Figure 1, and showing the relative position of the automobile radiator by means of a dotted outline.

Figure 3 is a rear elevation of the housing with a part broken away to reveal the interior construction.

Figure 4 is a detail section taken as indicated at line, 4—4, on Figure 2.

Figure 5 is a detail section taken as indicated at line, 5—5, on Figure 1.

As shown in Figure 1 the automobile radiator comprises a portion, A, normally exposed to the outer air for the purpose of radiating the engine heat and surmounted by a tank or reservoir, B, having a filler neck, C. The heating device which is the subject of this invention includes a housing, 1, which is open rearwardly toward the radiating surface, A, and which encloses any convenient form of heater such as a kerosene lamp comprising an oil reservoir, 2, and a burner, 3, of any suitable type. The lamp is shown as having a metallic chimney, 4, with a transparent window, 5, through which the flame, 6, may be observed, said window, 5, registering with a window, 7, in the front wall of the housing, 1.

The heat rising from the flame, 6, through the chimney, 4, strikes a deflector, 8, which is inclined upwardly toward the radiator, A, so as to direct the heat therethrough and warm the water in the radiator. Preferably, the rearwardly open side of the housing is provided with a wire gauze or screen, 9, to prevent the possibility of any gasoline vapor under the automobile engine hood from being ignited by the flame, 6, of the heater lamp. As shown, this screen, 9, may constitute the upper portion of the rear door, 10, hinged at 11 to the upper edge of the housing so that it may be swung open to permit removing the lamp bodily from the housing in lighting it, trimming its wick or otherwise adjusting the parts.

As indicated, particularly in Figures 2 and 4, the deflector plate, 8, is arched or curved away from the inclined top wall, 12, of the housing, forming an air space, 13, to which the outer air is admitted through ports, 14, in the front wall of the housing. This air becoming heated by contact with the hot deflector plate, 8, rises rapidly toward the radiator, A, and passes through the latter into the automobile hood, creating an induced draft which acts upon the air in the housing, 1, below the deflector plate, 8, and insures a more effective circulation of warm air than would otherwise be secured. Preferably vent holes, 15, are provided near the bottom of the housing to supply air for combustion at the flame, 6.

As shown in the drawings, the housing, 1, may be conveniently supported in position by means of a bail or hanger, 16, extending upwardly and around the filler neck, C, of the radiator. While this renders removal or application of the heater exceedingly simple, it is not even necessary to disturb its position for adjusting the flame, since registration of the windows, 5 and 7, permits the flame to be inspected at will, and a small swinging closure, 17, in the side wall of the housing, 1, gives access to the adjusting knob, 18, of the wick feeding means. When the vehicle is left standing where the radiator may be exposed to cold wind, it may be desirable to protect more of the radiating area than is normally covered by the housing, 1; for this purpose supplemental shields or wings, 19, are shown hinged to the rear edges of the side walls of the housing, 1, in position to be extended laterally from said housing, as shown in Figure 1 to cover the adjacent area of the radiator. Obviously, if desired, these wings may be dimensioned to cover the entire area of the radiator when the device is designed to fit any particular make of car. As shown, the shape of the wings conforms to that of the side walls, 20, of the housing, 1, so that when folded against the latter they will occupy practically no additional space, and the whole outfit may be conveniently stored away in the car or in the garage when out of use.

I claim:

1. A heater for an automobile radiator comprising a housing open at one side and adapted to be mounted with said open side adjacent a vertical surface of the radiator, together with a heating device in the housing, and laterally extending wings hinged to the housing for extension in the plane of its open side for shielding the adjacent radiator surface from the wind.

2. In the combination defined in claim 1, said wings being substantially similar in shape and area to the side walls of the housing, and being hinged in position for folding against said side walls when out of use.

In testimony whereof, I have hereunto set my hand at Chicago, Illinois, this 31st day of December, 1921.

SAM BREST.